June 30, 1931. W. S. LEE ET AL 1,812,492
ADJUSTABLE BRAKE LEVER
Filed May 17, 1929
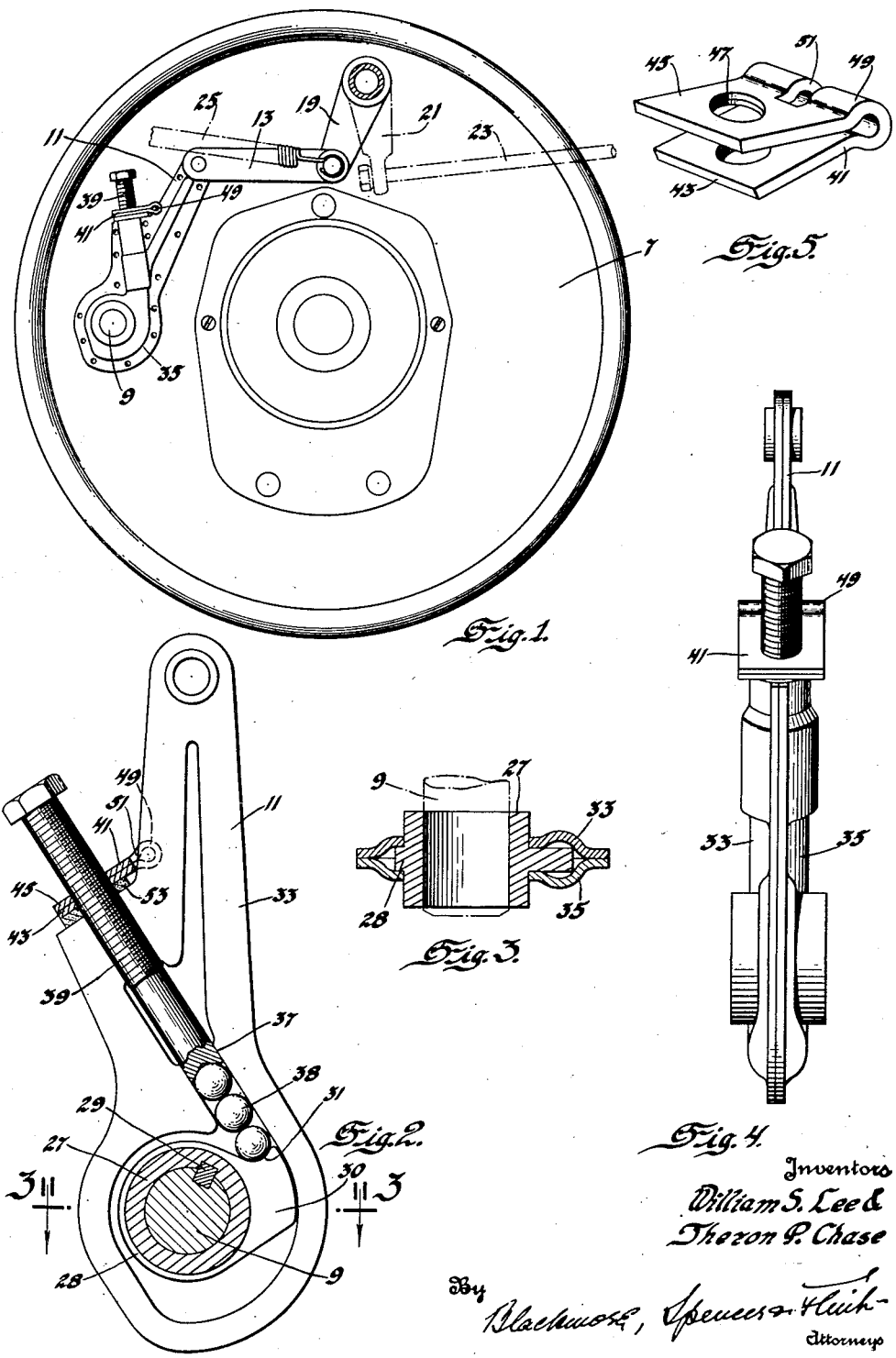
Inventors
William S. Lee &
Theron P. Chase
By Blackmore, Spencer & Hulbert
Attorneys Patented June 30, 1931

1,812,492

UNITED STATES PATENT OFFICE

WILLIAM S. LEE AND THERON P. CHASE, OF DETROIT, MICHIGAN, ASSIGNORS TO GENERAL MOTORS RESEARCH CORPORATION, OF DETROIT, MICHIGAN, A CORPORATION OF DELAWARE

ADJUSTABLE BRAKE LEVER

Application filed May 17, 1929. Serial No. 363,950.

This invention relates to brakes, and especially to brakes for vehicles. The invention has been designed as an improvement in a brake lever arm associated with the shaft extending through the backing plate, the rotation of which shaft operates the brake.

An object of the invention is to provide a simple and inexpensive operating lever. Another object is to provide a simple lever adjustment. Another object is to provide a simple and inexpensive expedient to lock the device in adjusted position. Other objects and advantages will be understood from the following specification.

In the drawings, Figure 1 is a view in side elevation, facing a backing plate. Figure 2 is a view in elevation of one of the lever parts, showing also the adjusting device in elevation and the locking expedient in section. Figure 3 is a section on line 3—3 of Figure 2. Figure 4 is a view in elevation. Figure 5 is a perspective of a detail.

Referring by reference characters to the drawings, numeral 7 represents the backing plate. This plate, together with the drum carried by the wheel, in the case of a wheelbrake, forms the brake housing. Rotatably mounted in the plate, 7, is a shaft, 9. This shaft is to rotate to actuate a band or shoes within the drum against the inner periphery of the drum. This invention is not concerned with the character of the brake within the drum and no such brake is illustrated. The shaft is rotated by an arm designated as a whole by numeral 11. The arm may be connected by a link, 13, with a lever arm, 19, rotating on a shaft suitably supported by the backing plate. This last mentioned shaft may also have an arm, 21, which is connected by a link, 23, to any suitable operating means, not shown. A suitable retracting spring is represented by numeral 25.

Outside the drum enclosure shaft, 9, carries a hub, 27, secured thereto by a key, 29. The hub, 27, is provided with a flange, 28. This flange is extended on one side to form a lobe, 30, the lobe having a curved surface, as at 31. Surrounding the hub are two mating stampings, 33 and 35. The stampings surround the flange of the hub, as best shown in Figure 3 and are radially directed to form the operating arm designated by numeral 11, as stated above. The two stampings, 33 and 35, when assembled about the flange, 28, may be secured together as by welding. The stampings are so shaped as to form between them a substantial tangential passage, 37. In this passage, adjacent the curved part, 31, of the lobe, are a plurality of spherical members, 38, the outermost engaging the surface, 31. These spherical members are held against the lobe by a screw member, 39, which is threaded in the outer end of passage, 37, this outer end being provided with cooperating threads. Adjustment of the screw member, 39, within the tangential passage operates through the instrumentality of the balls, 38, to change the relative position of the arm, 11, to the hub 27 and shaft, 9. The purpose of this adjustment is to correct for clearance between the brake shoes and the drum in a manner well understood in the art.

To lock the screw in adjusted positions, there is provided a resilient clip 41. This clip is of V shape as shown in Figure 5, and its resiliency causes the arms, 43 and 45, to be normally separated, as shown in the figure. Each arm has an aperture as at 47, which apertures are in alignment when the arms, 43 and 45, are brought together, as shown in Figure 2. The hinge portion, 49, of the clip is slotted as at 51, the slot receiving within its sides the adjacent portion of the lever arm, 11, as clearly disclosed in Figure 2. By this arrangement, the clip is held from rotation about the axis of the screw. Beneath the clip is a packing member, 53, designed to prevent the entrance of foreign matter into the threaded recesses.

In operation with the parts positioned as in Figure 2, where the arms of the clip are pressed together, it is possible to adjust the screw relatively to the lever arm, 11. By this adjustment it is possible to change the angular position of the lever arm and the shaft in a way to take up brake clearance. In making such adjustment, the turning of the screw in the threads of the lever arm is permitted, since the openings, 47, are in alignment. After the adjustment is made and the arms, 43 and 45, are free to separate as a result of the resiliency of the clip, 41, the clip grips the threaded screw and prevents any rotation thereof. There is thus provided a simple and inexpensive means for manufacturing a lever arm for use in connection with a brake shaft, or elsewhere. This invention also discloses a simple means for adjusting the relative position of the arm and shaft and a simple and effective lock to retain the parts in positions of adjustment.

Claims:

1. In combination, a shaft, a lobed hub rigid therewith, an adjustable lever arm comprising a pair of mating stampings, said stampings, when assembled, having aligned parts encompassing said shaft and engaging opposite faces of said hub, said arm also having mating radial arms, said stamping also shaped to form, when assembled, a tangential tubular passage, and means axially adjustable in said passage to engage said lobe and predetermine the angular relation of said lever arm relative to said shaft.

2. The invention defined by claim 1, said last named means comprising a plurality of antifriction members engaging said lobe, and a member threaded into said passage and engaging said antifriction members.

3. The invention defined by claim 1, said last named means having threaded engagement with the wall of said passage, and a normally V-shaped lock nut engaging said lever to prevent its rotation, in threaded engagement with said means, and resiliently biased toward a V-shape to lock said means from rotation in said passage.

4. In combination, a shaft, a lobed hub thereon, a lever arm encompassing said shaft and having parts engaging opposite faces of said hub and held thereby from axial movement, said lever having a tangential passage, means engaging said lobe and also including a member threaded in said passage, a locking device for said member, said locking device comprising a normally V-shaped resilient clip, said clip having threaded apertures in its sides, the threads of said apertures affording rotation relative to said threaded member when the sides are parallel and under resilient strain, said locking device having at its vertex a slot to engage said lever.

In testimony whereof we affix our signatures.

WILLIAM S. LEE.
THERON P. CHASE.